US012698443B1

(12) United States Patent
Ilgen et al.

(10) Patent No.: US 12,698,443 B1
(45) Date of Patent: Aug. 4, 2026

(54) SYSTEMS AND METHODS FOR CONTROLLING SUBCRITICAL FRACTURING VIA CHEMICAL COMPLEXATION REACTIONS AT THE CRACK TIP

(71) Applicant: National Technology & Engineering Solutions of Sandia, LLC, Albuquerque, NM (US)

(72) Inventors: Anastasia G. Ilgen, Albuquerque, NM (US); Robert C. Choens, II, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 588 days.

(21) Appl. No.: 17/545,251

(22) Filed: Dec. 8, 2021

Related U.S. Application Data

(60) Provisional application No. 63/123,103, filed on Dec. 9, 2020.

(51) Int. Cl.
| | |
|---|---|
| *C09K 13/04* | (2006.01) |
| *C04B 41/00* | (2006.01) |
| *C04B 41/53* | (2006.01) |
| *C04B 41/72* | (2006.01) |

(52) U.S. Cl.
CPC ............ *C09K 13/04* (2013.01); *C04B 41/009* (2013.01); *C04B 41/5353* (2013.01); *C04B 41/72* (2013.01)

(58) Field of Classification Search
CPC ....... E21B 43/16; E21B 43/267; C09K 13/04; C04B 41/009; C04B 41/5353; C04B 41/72
See application file for complete search history.

(56) References Cited

U.S. PATENT DOCUMENTS

| | | | | |
|---|---|---|---|---|
| 9,518,449 | B1* | 12/2016 | Brady ..................... | E21B 43/16 |
| 2013/0324443 | A1* | 12/2013 | Wang ................. | C04B 24/2688 |
| | | | | 166/305.1 |
| 2014/0311750 | A1* | 10/2014 | Heneman ............... | G06Q 50/02 |
| | | | | 702/27 |
| 2016/0137903 | A1* | 5/2016 | Friedheim .............. | C09K 8/502 |
| | | | | 507/104 |
| 2021/0201140 | A1* | 7/2021 | Watanabe ............ | G01N 21/274 |

OTHER PUBLICATIONS

Choens, R. C. et al., "Strenghening of Calcite Assemblages Through Chemical Complexation Reactions," Geophysical Research Letters (2021) 48, e2021GL094316, 10 pages.
Ilgen, A. G. et al., "Chemical controls on the propagation rate of fracture in calcite," Scientific Reports (2018) 8:16465, 13 pages.

* cited by examiner

*Primary Examiner* — Silvana C Runyan
(74) *Attorney, Agent, or Firm* — Daniel J. Jenkins

(57) ABSTRACT
The choice of anion in aqueous fluid composition therefore enables enhancing or arresting subcritical crack growth in crystalline and amorphous solids. The fluid composition selected based on anion's ability to form complexes with cation in the fracturing solid can be injected around wellbores, or into subsurface formations to stabilize them (decrease subcritical crack growth), or to enhance fracturing (hydrofracking). Applications include the development of chemical methods for both sealing and enhancing cracks in the subsurface and other environments where aqueous chemistry can be varied in a controlled manner.

9 Claims, 3 Drawing Sheets

SYSTEMS AND METHODS FOR CONTROLLING SUBCRITICAL FRACTURING VIA CHEMICAL COMPLEXATION REACTIONS AT THE CRACK TIP

CROSS-REFERENCE TO RELATED APPLICATIONS

This application claims priority to U.S. Provisional Patent Application No. 63/123,103, entitled "SYSTEMS AND METHODS FOR CONTROLLING SUBCRITICAL FRACTURING VIA CHEMICAL COMPLEXATION REACTIONS AT THE CRACK TIP," filed Dec. 9, 2020, which is incorporated herein by reference in its entirety.

STATEMENT OF GOVERNMENT INTEREST

The United States Government has rights in this invention pursuant to Contract No. DE-NA0003525 between the United State Department of Energy and National Technology & Engineering Solutions of Sandia, LLC, both for the operation of the Sandia National Laboratories.

FIELD

The present disclosure is generally directed to controlling subcritical cracking in solid materials with either crystalline or amorphous (glass) structure; and more particularly directed to using chemical complexing species to bind to cations in the solid materials at a crack tip, which leads to crack arrest.

BACKGROUND

Subcritical cracking is one of the main mechanisms responsible for deformation and associated changes in permeability of subsurface rocks, as well as degradation of manmade materials. Understanding how cracks nucleate and grow in rock formations is crucial for subsurface applications, including resource extraction, storage of nuclear waste, and geologic carbon sequestration. Critical cracking occurs when a solid sample is stressed sufficiently to cause immediate and catastrophic crack growth (rupture of chemical bonds), and this threshold stress is usually defined at ambient conditions. Subcritical cracking, as defined in the scope of this disclosure, means slow and stable crack growth at stresses less than critical levels via a chemically-assisted process. The stress conditions at which critical cracks develop can be predicted and understood reasonably well. Subcritical crack growth is less understood. The crack propagation in the subsurface has been traditionally addressed by careful monitoring of stress conditions and taking measures to not exceed critical values to avoid detrimental cracking. During resource extraction, subsurface engineering, or fluid injection for carbon storage, the in situ state of stress and chemical conditions in reservoirs change. Chemical reactions can significantly decrease rock strength, which means that chemically-assisted changes may lead to failure in a reservoir even for minor mechanical perturbations. Subtle chemically-assisted fracture enhancement has been proposed by using surfactants, which cause weakening and crack bifurcation. However, there are no robust methodologies utilizing chemical reactions at a crack tip to control fracturing in chemically complex and heterogeneous subsurface rocks.

What is needed is environmentally benign systems and methods that can control the growth rate for subcritical cracks in crystalline and amorphous solids that overcomes the deficiencies of the prior art.

SUMMARY OF THE DISCLOSURE

The present disclosure is directed to systems and methods for controlling the propagation rate for subcritical cracks in crystalline and amorphous solids. In an embodiment, the solids may be subsurface rocks or manmade inorganic solids. Subcritical cracks can propagate at stress values below critical stress levels via several chemically-assisted mechanisms. Controlling subcritical cracks (increasing or decreasing their growth rate and stress where onset of fracturing takes place, or fracture toughness) is a substantial challenge for subsurface resource recovery, preserving wellbore integrity, and ensuring safety of geologic waste disposal for nuclear waste and carbon dioxide.

According to an embodiment of the disclosure, a system for controlling crack propagation is disclosed that includes a fluid source that includes an aqueous fluid including anions and a system for injecting or contacting the aqueous fluid from the fluid source into or within a crystalline or amorphous material. The aqueous fluid can be selected from a first aqueous fluid comprising sulfate, phosphate, oxalate, chloride, bromide and fluoride anions to arrest tip crack growth or a second aqueous fluid containing lower concentrations of these anions or an anion with a weaker complexation affinity (e.g., $OH^-$) to promote crack growth.

According to another embodiment of the disclosure, a method is disclosed that includes selecting a fluid from a first fluid including a first group of anions that form weak surface complexes with cations at a crack tip within a crystalline or amorphous material and a second fluid containing a second group of anions that form stronger chemical complexes with cations at a crack surface and injecting or contacting the selected first or second fluid into or with a crystalline or amorphous material.

An advantage of the disclosure is that injected fluid chemistry is a controllable variable that can be easily modified to alter subcritical fracture toughness and crack growth rate in geologic formations.

Another advantage of the disclosure that by arresting subcritical crack growth, users may be able to prevent damage in wellbore or subsurface reservoir rocks in applications where such cracking diminishes performance.

Another advantage of the disclosure is that users can increase subcritical crack growth to enhance fracturing and fracture network growth in hydraulic stimulations.

BRIEF DESCTIPTION OF THE DRAWINGS

Figure 4A:
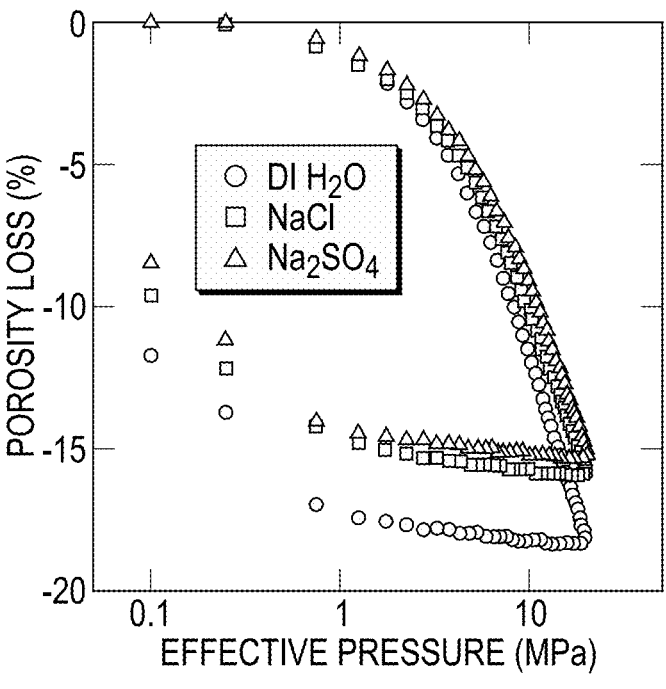

FIG. 4A shows experimental results of granular calcite consolidation: porosity loss versus effective pressure, and cumulative acoustic emissions (AE) versus effective pressure for experiments conducted with different pore fluid chemistries (DI $H_2O$—open circles, NaCl—open squares, and $Na_2SO_4$—open triangles). The faster consolidation is indicative of chemically-assisted micro-fracturing of calcite grains.

Figure 4B:
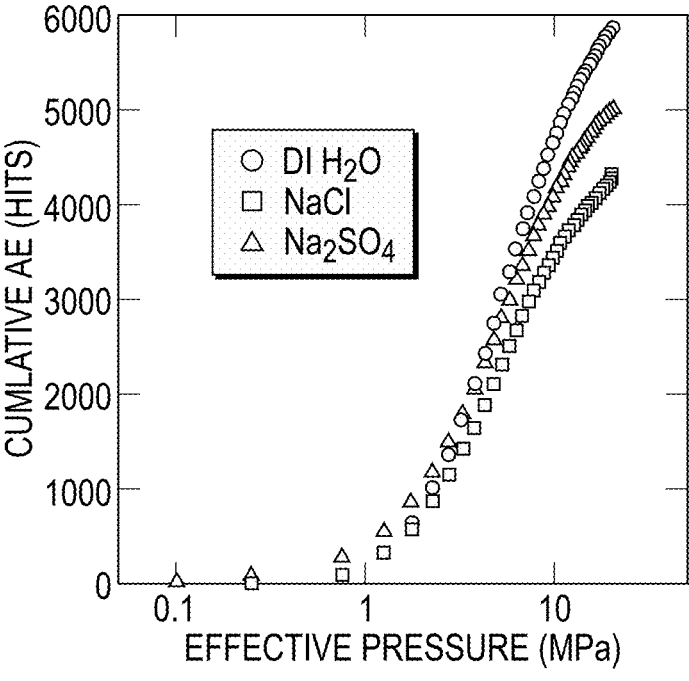

FIG. 4B shows experimental results of granular calcite consolidation: porosity loss versus effective pressure for experiments conducted with different pore fluid chemistries: DI $H_2O$—open circles, NaCl—open squares, and $Na_2SO_4$—open triangles.

The additional drawings disclose various embodiments of the disclosure.

DETAILED DESCRIPTION OF THE DISCLOSURE

The present disclosure is directed to systems and methods to control crack length and growth rate during subcritical (chemically-assisted) fracturing in crystalline and amorphous solids via fluid chemistry that modifies chemical environment at the crack tip by forming a chemical complex (bond between an anion in the fluid and a cation within solid's crystalline or amorphous matrix). The crystalline solid may be a crystalline solid containing a cation that does not strongly hydrolyze water (a cation that forms strong base, including monovalent $Li^+$, $Na^+$, $K^+$, $Rb^+$, $Cs^+$, and divalent $Ca^{2+}$, $Sr^{2+}$, $Mg^{2+}$, $Ba^{2+}$). The solid may comprise, but not limited to, carbonates of these cations, such as calcite described below, and oxides/hydroxides of these cations (e.g., portlandite cement). In an embodiment, the amorphous solid is any amorphous solid with framework ions listed above. In an embodiment, the crystalline solid is calcite.

It has been unexpectedly found that the chemical complexation reactions at the crack tip, for example in calcite, change effective fracture toughness in situ (in liquid), as evidenced by changing crack growth rates and final crack length. By changing the chemistry of the aqueous fluid in contact with the crystalline solid, crack growth can be promoted by using a weakly-binding anion (e.g., chloride) in place of a strongly-binding anion or crack growth can be arrested by adding a strongly-binding anion that forms a chemical complex with the cation in the solid. In an embodiment, the weakly-binding anion is hydroxyl $OH^-$. In an embodiment, the strongly-binding anion is a sulfate, phosphate, oxalate, chloride, bromide and fluoride. Complexing the anion with the cation thereby reduces the anion concentration in the introduced fluid. In another embodiment, the crack growth rate can be promoted by reducing the concentration of a strongly-binding anion in favor or a weakly binding anion.

Introducing fluid containing anions that can strongly complex with cations in solid phase inhibit crack growth, while introducing fluids with low propensity to complex with solid's cations increases subcritical crack growth. By arresting subcritical crack growth, users are able to prevent damage in wellbore or subsurface reservoir rocks in applications where such cracking diminishes performance. Users can increase subcritical crack growth to increase fracture network growth in hydraulic stimulations.

The complexation reactions described above have been demonstrated to control consolidation process and fracture density in granular calcite at pressures up to 20.25 MPa. Consolidation rates of polycrystalline calcite have been measured in the presence of aqueous fluids with weakly- and strongly-complexing anions for calcium, and found that consolidation rate, cumulative acoustic emissions signal due to fracturing, and final crack density increase with decreasing complexation favorability between calcium and anion in the solution phase. The highest extent of fracturing is observed in de-ionized water, which has no anions for complexing with calcium inside the crack tip.

In an embodiment, this disclosure presents a significant advancement for controlling fracturing in subsurface reservoirs. The disclosed systems and methods offer a systematic way of choosing aqueous chemistry of injected fluids or modifying the aqueous chemistry of crack fluid to either promote or diminish the propagation of cracks in subsurface reservoirs, around wellbores, and other applications where aqueous chemistry within cracks can be changed and controlled.

In an embodiment, the single crystal grains or poly-crystalline materials may be part of a structure material that includes crystal, crystalline or compounds containing a cation, as discussed above, that does not strongly hydrolyze water, including monovalent $Li^+$, $Na^+$, $K^+$, $Rb^+$, $Cs^+$, and divalent $Ca^{2+}$, $Sr^{2+}$, $Mg^{2+}$, $Ba^{2+}$. The solid may comprise, but not limited to, carbonates of these cations, such as calcite described below, and oxides/hydroxides of these cations (e.g., portlandite cement). The term "that does not strongly hydrolyze water" means a cation that does not promote dissociation of water molecules. These cations form strong bases (e.g., KOH, NaOH, etc.) that fully dissociate during their dissolution in water. In an embodiment, the structure may be, but is not limited to a subterranean formation made up of igneous (basalt, rhyolite, tuff), metamorphic (gneiss, quartzite, marble), or sedimentary rocks (sandstone, limestone, mudstone, or other calcite-rich lithologies).

In an embodiment, the single crystal or poly-crystalline grains may be part of a subterranean formation crystalline and/or amorphous materials that may include minerals and rocks that may include other crystalline or amorphous compounds containing a cation as discussed above that does not strongly hydrolyze water, including monovalent $Li^+$, $Na^+$, $K^+$, $Rb^+$, $Cs^+$, and divalent $Ca^{2+}$, $Sr^{2+}$, $Mg^{2+}$, $Ba^{2+}$. The solid may comprise, but not limited to, carbonates of these cations, such as calcite described below, and oxides/hydroxides of these cations (e.g., portlandite cement).

The systems and methods use the complexation affinity between cation in the solid's matrix and aqueous anions as the means of controlling subcritical cracks in minerals and rocks, and in other solid phases that can be in contact with aqueous solutions. The systems and methods are effective for one of the most abundant minerals in the Earth's crust-calcite. The measurements confirming this mechanism are: (1) crack growth rate for pre-fractured single crystal calcite in situ (in liquid); and (2) consolidation of polycrystalline calcite in situ (in liquid) under constant mechanical load. In both cases, cracks were arrested when aqueous anion had strong binding constant with the solid's cation. This phenomenon identifies the key criteria for selecting aqueous composition which would enable controlling subcritical cracks in the subsurface reservoirs and around wellbores. The method includes selection criteria for fluids to be injected around wellbores, or into subsurface formations to stabilize them (decrease subcritical crack growth), or to enhance fracturing (hydrofracking). This method can also be applied to other types of natural and man-made materials subject to subcritical cracking, where chemistry at the crack tip can be controlled. For example, the natural materials may be, but are not limited to igneous (basalt, rhyolite, tuff), metamorphic (gneiss, quartzite, marble), or sedimentary rocks (sandstone, limestone, mudstone, or other calcite-rich lithologies). Man-made materials may include different concrete and cement compositions (e.g., portlandite).

In an embodiment, the disclosed systems and methods control subcritical crack propagation for single crystal calcite and poly-crystalline calcite grain packs by changing the composition of the aqueous fluids in contact with the solids. The systems and methods use the complexation affinity between cation in the solid's matrix and aqueous anions as the means of controlling subcritical cracks in minerals and rocks, and in other solid phases that can be in contact with aqueous solutions. This method can also be applied to other types of natural and man-made calcite (discussed above) including materials subject to subcritical cracking, where chemistry at the crack tip can be controlled.

In an embodiment, the fluid that promotes crack propagation contains anions that weakly complex with the cation in the solid at the crack tip as not to interfere with aqueous driven subcritical crack growth. This can entail the aqueous solution itself, or additives to a pre-existing solution to reduce surface complexation affinity, or dilution of anions in the solution. In an embodiment, the fluid chemistry that promotes crack propagation is de-ionized water, aqueous solutions containing no anions or low (<0.001M) concentration of anions, and dilute (<0.001M) sodium chloride solutions.

In an embodiment, the fluid chemistry that inhibits crack propagation contains anions that complex strongly with the cation in solid to effectively shield the crack tip from aqueous environments that enable subcritical cracking. In an embodiment, the fluid chemistry that arrests crack growth and is chloride, sulfate, and phosphate anions. The ability of an anion or arrest or promote a crack is dependent upon both the concentration of the anion in solution and ionic strength of the solution. So, for example, a weaker anion can inhibit or arrest crack propagation if it is present at a high concentration. In an embodiment, the concentration of the anions in the aqueous environment needs to be (0.05M or higher) to effectively arrest crack propagation.

EXPERIMENTAL

Figure 1:
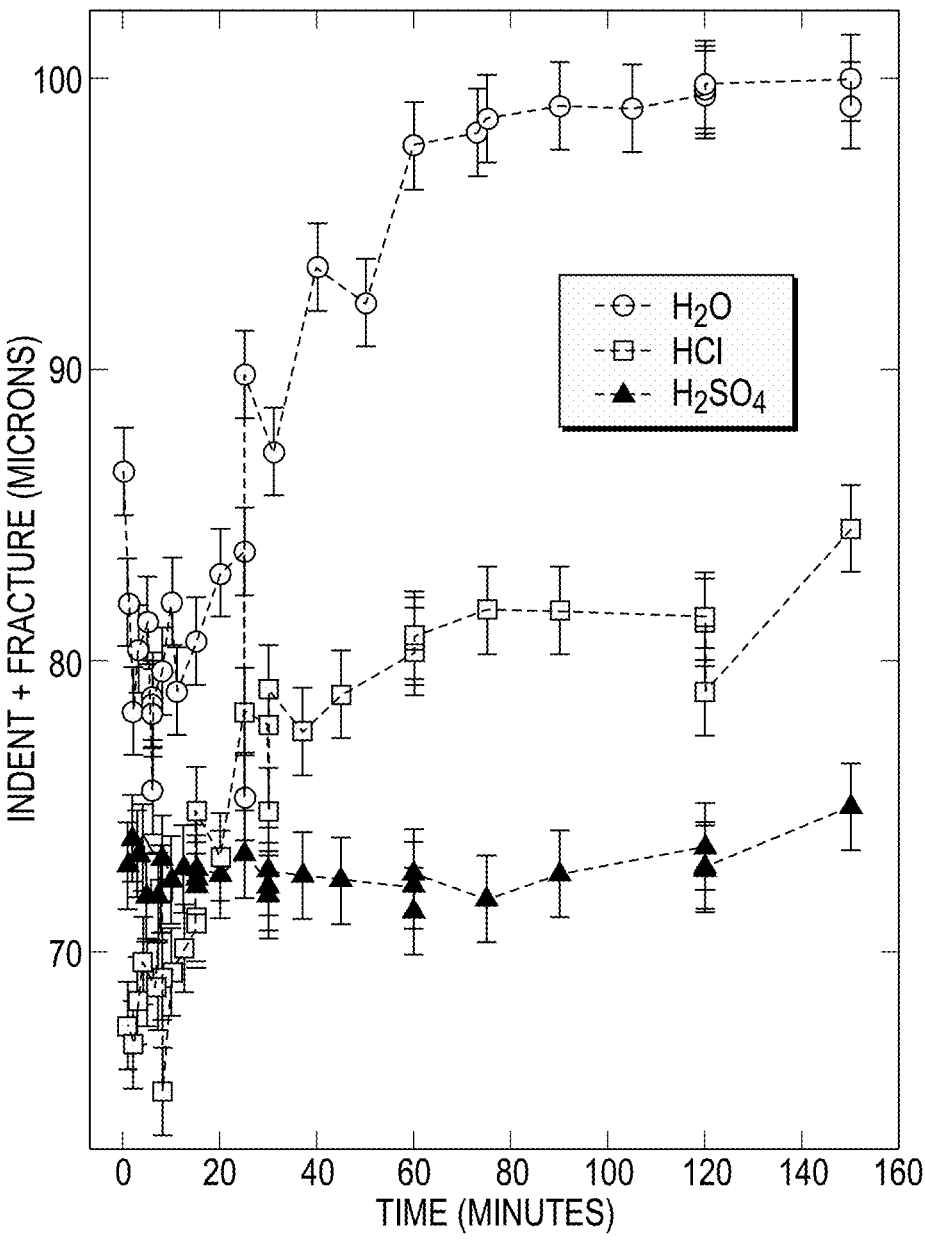
FIG. 1 illustrates the rate of crack growth in pre-cracked calcite single crystals upon their exposure to aqueous solutions. Error bars: one standard deviation of measurement, which was on average±1.5 μm.
Figure 2:
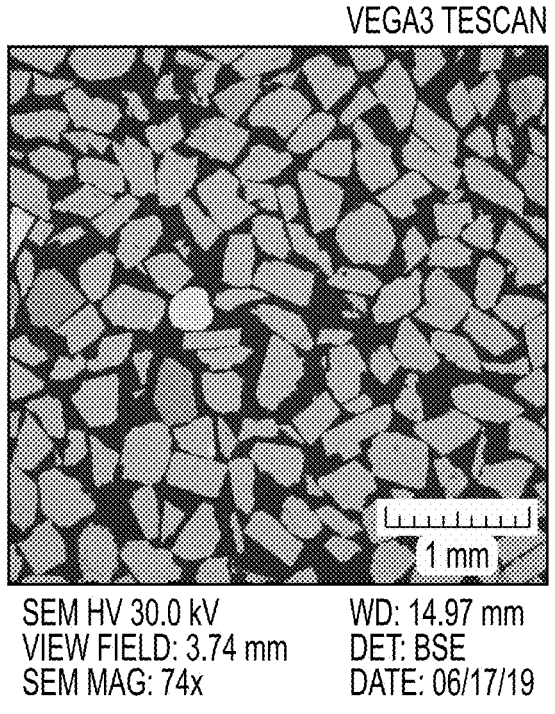
FIG. 2 illustrates calcite grains used in consolidation experiments 300-355 micron grain diameter.
Figure 3:
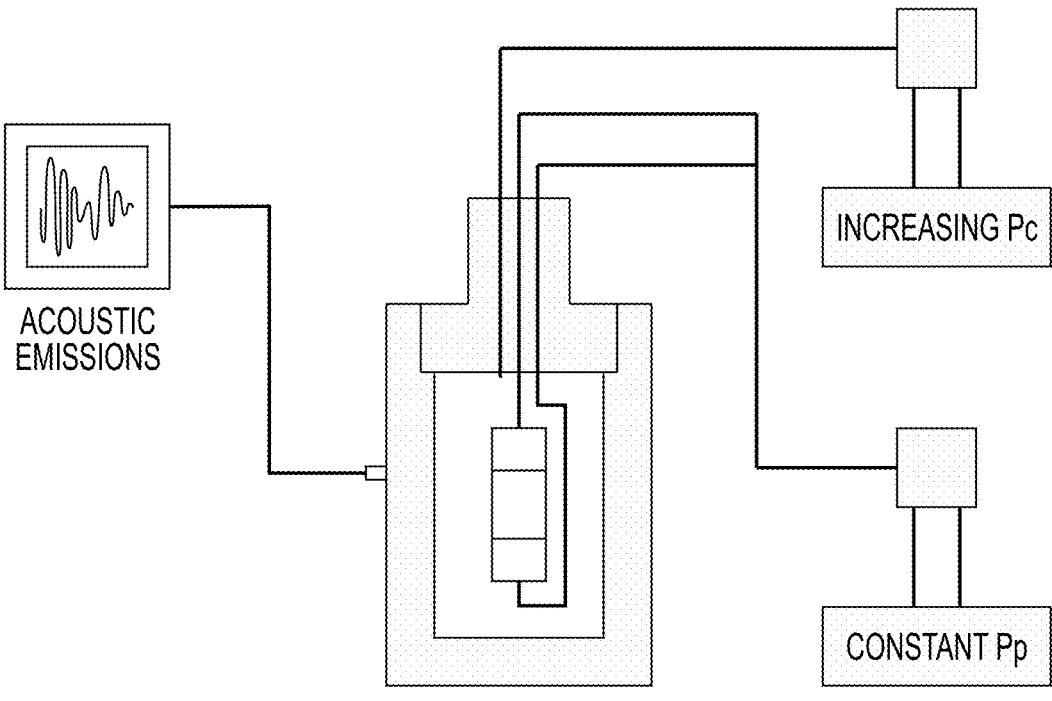
FIG. 3 illustrates a consolidation apparatus according to an embodiment of the disclosure.

A series of crack growth experiments were performed on pre-stressed, pre-fractured single crystal calcite samples submerged in aqueous fluids (FIG. 1); and a separate series of consolidation tests were performed on granular calcite assemblages saturated with fluids under constant mechanical loading (FIGS. 2 and 3). Experimental evidence is presented below using both approaches illustrating the validity of the proposed chemical mechanism.

Experiments: crack growth rate for individual cracks in situ (in liquid) in pre-stressed single crystal calcite in the absence of external mechanical load.

For these in situ experiments, a single crystal calcite CaCO3 from MTI corporation cut along the (100) crystallographic surface was used. To create the pre-fractured samples with identical initial cracks, CaCO3 was indented at ambient conditions using a Vickers indenter tip to a maximum load of 400 mN. Each tested crystal contained one indent, with all indents having same residual stress at the crack tips prior to the experiments.

To initiate the in situ crack growth experiment, the individual indented samples were submerged in ~3 mL of electrolyte solution. Indented CaCO3 surface with cracks extending from the indent corners were observed. The electrolyte solution compositions are listed in Table 1. Once a pre-fractured sample was exposed to the electrolyte solution, fractures grew from the indent site (FIG. 1). To measure crack growth rate, a Nikon Eclipse 80i optical microscope was used in combination with a SPOT 7.2 camera. Images were taken at pre-determined time intervals, for up to four hours of reaction, when crack growth stopped. Crack length was quantified by tracing over the optical image using ImageJ analysis software.

TABLE 1

Composition of aqueous fluids used in in situ calcite crack experiments.

| Fluid | Composition | pH |
|---|---|---|
| De-ionized (DI) $H_2O$ | DI $H_2O$ | 6.5 |
| Hydrochloric acid (HCl) | DI $H_2O$, HCl | 5.3; 4.2; 3.8; 3.1; 2.1 |
| Sulfuric acid ($H_2SO_4$) | DI $H_2O$, $H_2SO_4$ | 4.4; 4.5; 3.8; 3.0; 2.0; 1.4 |

The observed crack growth rate and length depended on the composition of aqueous fluid. The rates of crack growth for de-ionized water, and dilute hydrochloric and sulfuric acids are shown in FIG. 1. During the measurements, no external mechanical loading was applied to the samples, and cracks grew due to the interaction of aqueous fluids and residual stresses at the indentation sites. Control samples not exposed to aqueous fluids did not display any changes in initial crack geometry or length over time. As the cracks grew, the magnitude of the residual stress field decreased, and therefore the cracks stopped growing after an equilibrium length was reached. The final length of the cracks depended on the chemical composition of the fluid. It was determined that the crack growth rates did not correlate with either the calcite dissolution rate or with the fluid pH.

The fastest crack growth rate was observed for cases when calcite was submerged in de-ionized water, compared to the electrolyte solutions. The crack growth rate and final length followed this order DI H2O>dilute HCl>dilute H2SO4. Based on the aqueous speciation calculations, calcium forms stronger complexes with $SO4^{2-}$ than $Cl^-$. Based on this crack growth data, if the anion present in solution complexes strongly with calcium in the calcite lattice, then crack growth will be inhibited. To validate this mechanism for subsurface-relevant conditions, consolidation experiments were performed on granular calcite and under constant mechanical loading, as detailed below.

Experiments: consolidation of polycrystalline calcite in situ (in liquid) under mechanical loading Artificial grain packs of calcite were consolidated in the presence of different aqueous electrolyte solutions. When using natural geomaterials, sample to sample variation can be significant in otherwise similar rocks. Most chemically-assisted crack studies on real rocks focus on the propagation of a single tensile crack, and the brittleness of geomaterials combined with inherent fine-scale heterogeneity lead to scatter in experimental results. Often, the scatter seen in experiments can mask the observed chemical effects. By utilizing grain packs, we upscale the experimental results from single nano-indented fracture sites to a geologically relevant grain assemblage. Further, consolidation of granular packs at sufficient pressures induces failure of individual grains, resulting in a multitude of micron-scale fractures in the core sample. This approach allows for averaging out some of the inherent effects of heterogeneities in geomaterials when studying chemically-assisted cracking.

For these in situ experiments, natural granular calcite available from a commercial source (Huber Carbonates, LLC) was used. Calcite grains were sieved to a 300-355 micron grain diameter range. Calcite grain packs were constructed in preformed polyolefin jackets affixed to titanium endcaps. Samples are deformed in pressure vessels that allow for independent control of external and internal pressure in samples. Both pressures were controlled by independent pumps. External pressure, or confining pressure, was increased in increments at set time intervals. Internal pressure, or pore pressure, was maintained at a constant value, and we used the changes in pump displacement to maintain the set value to calculate sample strain. The pore pressure was delivered by the aqueous solution containing target anions under investigation, so that all grains in the sample were exposed to the controlled fluid chemistry.

Samples were loaded into the pressure vessel dry. Both ends of the sample were connected to pore fluid lines that are plumbed to the vessel head and connected to the pore pressure pump. The vessel was sealed and filled with the confining fluid, propylene glycol (not in contact with sample material), and all air was bled from the lines. The system was initially pressurized to 0.52 MPa. The granular calcite sample was saturated with electrolyte solution in situ by flowing pore fluid through the bottom of the sample using a syringe pump at a flow rate of 1 mL per minute. The fluid forces air out of the top of the sample, ensuring saturation. Confining pressure was then raised to 1.1 MPa, and pore pressure was raised to 1 MPa. The sample was held at pressure overnight to ensure full saturation and to allow the pore fluid to chemically equilibrate with calcite. A piezoelectric transducer fixed to the outside of the vessel was used to monitor for acoustic emissions (AE) during deformation. Commercial hardware and software were used to process the AE signals.

To begin the experiment, confining pressure was raised to 2.5 MPa while pore pressure was held constant at 1 MPa for an effective pressure of 1.5 MPa. The sample was then incrementally loaded by increasing the confining pressure by 0.5 MPa every 5 minutes while pore pressure was maintained at a constant 1 MPa. Volume change associated with maintaining a constant pore pressure was used to calculate volume strain during consolidation. The sample was loaded to a maximum effective pressure of 20.5 MPa. The sample was unloaded following the same increments.

Three experiments were performed with different pore fluids: deionized water (DI H2O), 0.5M sodium chloride (NaCl), and 0.5M sodium sulphate (Na2SO4). Observed consolidation depended on the type of pore fluid present (FIGS. 4A-4B). Porosity loss was greatest in DI H2O, and less in the brines. NaCl had higher compaction than Na2SO4, consistent with the single crack growth experiments detailed above. This observed strengthening of calcite is due to the higher affinity for $SO_4^{2-}$ to form complexes with calcium within crack tip, when compared to $Cl^-$. AE, which serves as a proxy for induced damage (microcracks), shows higher total counts in DI H2O as compared to both NaCl and $Na_2SO_4$. This is consistent with our proposed mechanism for subcritical crack growth with surface complexation reactions inhibiting crack growth.

These new findings of chemical complexation at the crack tip and its effect on crack velocity and length form the basis for a methodology to control cracks and fracture networks in natural and engineered systems. Applications include the development of chemical methods for both inhibiting and enhancing cracks in the subsurface and other environments where aqueous chemistry in contact with material undergoing cracking can be varied in a controlled manner. For example, during carbon dioxide storage caprock can be "repaired" by targeted injection of fluid with composition selected based on our described methodology. Similarly, concretes can be repaired. This method can also be used for enhanced fracturing (hydrofracking and enhanced geothermal systems).

In the invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosure of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A system for controlling crack propagation, comprising consisting essentially of:
   a fluid source that consists essentially of an aqueous fluid consisting essentially of water and anions; and
   a system for contacting the aqueous fluid from the fluid source into within a crystalline material;
   wherein the anions are selected from the group consisting essentially of a sulfate, anions to arrest tip crack growth to promote crack growth by forming a chemical complex with the crystalline material.

2. The system of claim 1, wherein the crystalline material contains a cation selected from the group consisting of Li', $Na^1$, K, $Rb^1$, Cs', $Ca^{21}$, $Sr^{21}$, $Mg^2$, and $Ba^{2+}$.

3. The system of claim 2, wherein the cation is in a functional group selected from the group consisting of oxides and hydroxides of these cations.

4. The system of claim 1, wherein the crystalline material is a rock or an individual component of rock in a subterranean formation.

5. The system of claim 1, wherein the crystalline material is calcite.

6. The system of claim 1, wherein the crystalline material is portland cement.

7. The system of claim 1, wherein the first aqueous fluid anion is sulfate.

8. The system of claim 1, wherein the sulfate anions are at a concentration of greater than 0.1 M and less than the saturation concentration in the aqueous fluid.

9. The system of claim 1, wherein the sulfate, phosphate, oxalate, chloride, bromide and fluoride anions are at a concentration of greater than 1 M and less than the saturation concentration in the aqueous fluid.

* * * * *